United States Patent
Huntzinger et al.

[15] 3,671,843
[45] June 20, 1972

[54] DUAL VOLTAGE CHARGING SYSTEM

[72] Inventors: Gerald O. Huntzinger, Anderson; Leonard J. Sheldrake, Noblesville, both of Ind.

[73] Assignee: General Motors Corporation, Detroit, Mich.

[22] Filed: May 5, 1971

[21] Appl. No.: 140,342

[52] U.S. Cl. .................................................320/15, 320/40
[51] Int. Cl. ..................................H02j 7/00, H02j 7/14
[58] Field of Search..................320/6, 15, 17, 39, 40; 323/15

[56] References Cited

UNITED STATES PATENTS

| | | | |
|---|---|---|---|
| 3,090,871 | 5/1963 | Gorman | 320/15 X |
| 3,413,536 | 11/1968 | Webb | 320/40 X |
| 3,463,995 | 8/1969 | Herold | 320/6 |
| 3,560,832 | 2/1971 | Kirk | 320/39 X |

Primary Examiner—J. D. Miller
Assistant Examiner—Robert J. Hickey
Attorney—E. W. Christen, C. R. Meland and Albert F. Duke

[57] ABSTRACT

First and second batteries are connected in series between the terminals of a vehicle starting motor. The DC output terminals of a DC generator are connected across the first battery and also across a voltage sensitive switch and the oscillator transformer input stage of a DC to DC converter. The rectifier output stage of the DC to DC converter is combined with a voltage regulator that is connected across a second battery. The voltage sensitive switch renders the input stage of the converter operative when the output of the the generator is greater than a first predetermined voltage and inoperative below. The voltage regulator maintains a second predetermined voltage across the second battery by rendering the output stage of the converter operative to charge the second battery when the voltage thereon is below the second voltage and inoperative above.

5 Claims, 1 Drawing Figure

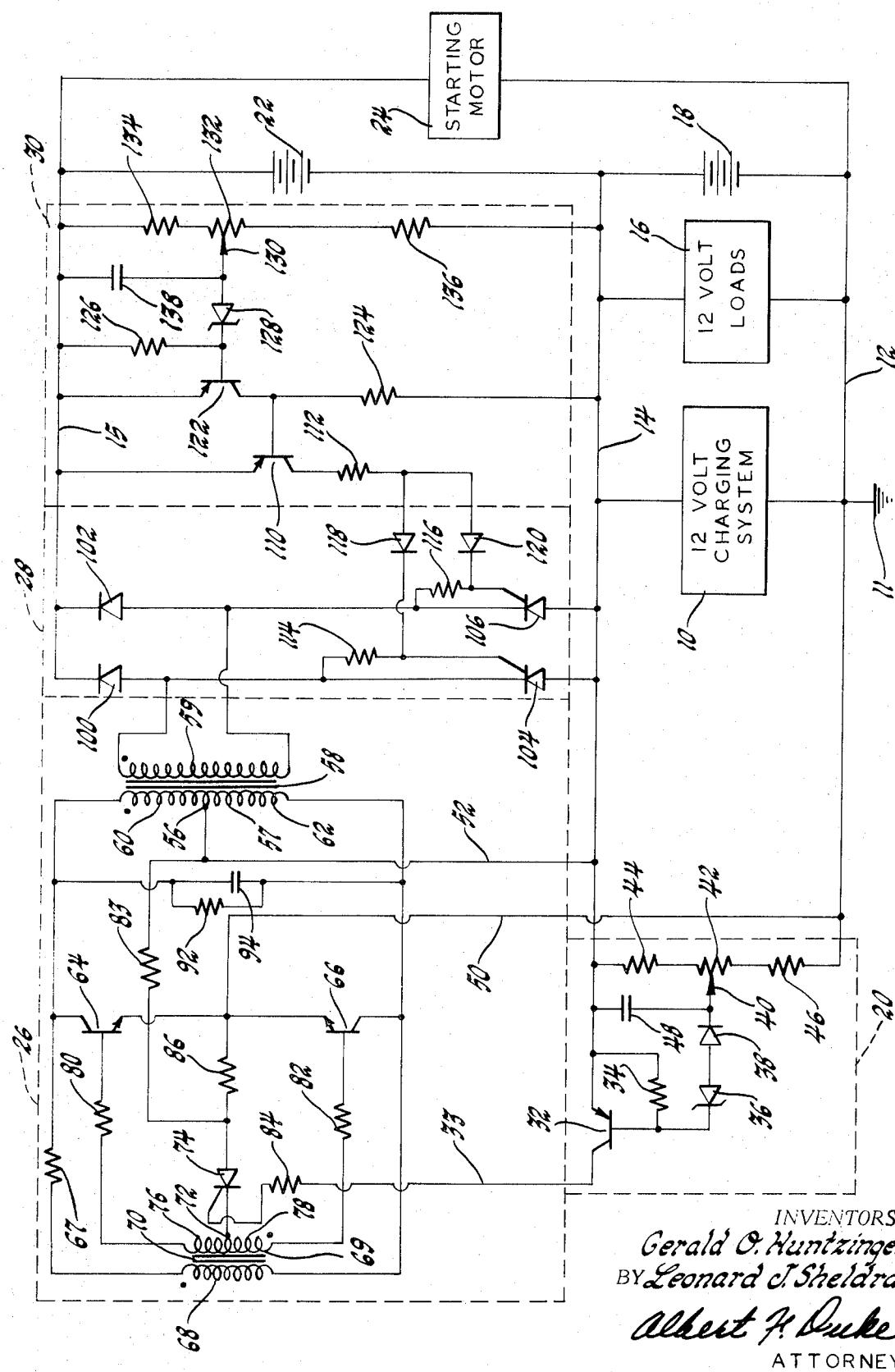

DUAL VOLTAGE CHARGING SYSTEM

This invention relates to a system for maintaining a predetermined voltage on auxiliary battery connected in series with a main battery provided that the output of the system charging the main battery is above a predetermined level.

To assure the availability of adequate battery power for starting vehicles, an auxiliary battery is often connected in series with the main system battery. The batteries could then be connected in one of several configurations for charging. They could be charged in series, or the main battery could be charged normally from the charging system while the auxiliary battery were trickle charged, or they could be connected in parallel and charged simultaneously. Since the auxiliary battery is usually used less than the main battery and therefore requires less charging, the first and second approaches incur the risk of overcharging the auxiliary battery. The parallel charging approach while reducing the risk of overcharging incurs the complications and expense of a series-parallel switch required to change the running series connection of the batteries to the charging parallel configuration.

It is therefore desirable to have a system for charging both batteries from one charging source in a manner that avoids both the risk of overcharging one of the batteries and also the difficulties and expense incurred with the series-parallel switch. Moreover, it is desirable to provide such a charging system wherein a predetermined voltage is maintained on the auxiliary battery supplying the extra starting power if the system charging the main battery provides an adequate output thereto.

The present invention provides these features by means of a conventional 12-volt charging system, the output of which is connected to a junction between series connected batteries and also to the input of a DC to DC converter. This converter is comprised of an oscillator stage and a rectifier stage, the operation of which is controlled respectively by a voltage sensitive switch connected across the output of the charging system and a voltage regulator connected across the terminals of the auxiliary battery to be charged. The voltage sensitive switch activates the oscillator stage when the output of the charging system exceeds a first predetermined voltage and deactivates the oscillator below this voltage. The voltage regulator maintains a second predetermined voltage on the auxiliary battery by activating the rectifier to allow charging of the auxiliary battery below the second voltage and deactivating the rectifier above this voltage.

It is therefor a primary object of the present invention to provide a charging system for charging two batteries connected in series so that a predetermined voltage is maintained on the auxiliary battery if the charging system produces an adequate output to the main battery.

It is another object of the present invention to provide a charging system of the foregoing type where the auxiliary battery is charged from the output of a DC to DC converter the input to which is enabled only when the charging system provides adequate output to the main battery.

It is a further and more specific object of the present invention to provide a charging system of the foregoing type wherein the output of the DC to DC converter is selectively operable to charge the auxiliary battery only when the voltage across the auxiliary battery is less than a predetermined voltage.

Further objects, advantages and details of the present invention will become apparent from the following description taken in conjunction with the single drawing which shows a preferred embodiment of the invention for charging one of two series connected batteries on demand when the charging system is operative to provide an adequate output to the other battery.

With reference now to the single drawing, there is shown a conventional 12-volt charging system 10 comprising a conventional alternator and regulator (not shown) connected between DC load conductors 12 and 14, conductor 12 being connected to a point of constant reference potential 11. Also connected between load conductors 12 and 14 are 12-volt loads 16, a 12-volt battery 18 and a voltage sensitive switch 20. A second battery 22, here also 12 volts, is connected in series with battery 18 and both batteries are connected across the terminals of a starting motor 24. DC load conductors 12 and 14 of charging system 10 are connected to the input terminals of a DC to DC converter comprised of an oscillator input stage 26 and a rectifier output stage 28. Voltage sensitive switch 20, when it detects greater than a first voltage across DC load conductors 12 and 14 activates oscillator 26 which, when so activated feeds rectifier stage 28. An output is enabled from rectifier 28 by voltage regulator 30 to maintain a second voltage across battery 22.

Voltage sensitive switch 20 is comprised of a PNP transistor 32, the emitter of which is connected to load conductor 14 and the collector of which is connected to the input of oscillator stage 26 through conductor 33. Biased from conductor 14 through resistor 34, the base of transistor 32 is connected through Zener diode 36 and diode 38 to wiper 40 of potentiometer 42, the latter connected in series with resistors 44 and 46 as a voltage divider across DC load conductors 12 and 14. The transistor 32 is rendered conductive when the voltage on conductor 14 exceeds the potential at wiper 40 by an amount sufficient to break down Zener 36 and forward bias diode 38, such breakdown providing a path for the base current through transistor 32. So that transistor 32 is not rendered conductive by transients in the output of charging system 10, a capacitor 48 is connected between the emitter of transistor 32 and the base circuit thereof at the cathode of diode 38.

Oscillator stage 26 is connected between load conductors 12 and 14 of charging system 10 respectively by conductors 50 and 52. Conductor 52 is connected to the center tap 56 of the primary winding 57 of nonsaturating step-up transformer 58 which, through a turns ratio of about 16:12, produces about 14 volts on secondary winding 59 thereof for a 12.5 input to oscillator 26 after losses therein. The ends of primary halves 60 and 62 of winding 58 are respectively connected to the collectors of NPN transistors 64 and 66 and also through resistor 67 to the ends of primary winding 68 of a 1:1 saturating base supply transformer 70. Secondary winding 69 of transformer 70 has a center tap 72 connected to the cathode of a silicon controlled rectifier (SCR) 74, and the ends of secondary halves 76 and 78 of winding 69 are connected through resistors 80 and 82 respectively to the bases of transistors 64 and 66. With the anode of SCR 74 supplied from load conductor 14 through conductor 52 and resistor 83, SCR 74 is rendered conductive when the gate thereof is enabled through resistor 84 and conductor 33 at such time that transistor 32 is rendered conductive by the operation of voltage sensitive switch 20 as hereinabove explained. In this manner, transistor 32 and SCR 74 cooperate to provide an adequate base drive to transistors 64 and 66 without any overheating of SCR 74 when transistor 32 is near its shut-off point. Resistor 86 connected between the anode of SCR 74 and return conductor 50 provides a return path for the current flowing in conductor 50 when SCR 74 is turned off by transistor 32. To provide a discharge path for the energy in primary winding 57 and also to filter switching transients appearing on the collectors of transistors 64 and 66, resistor 92 and capacitor 94 are connected in parallel thereacross.

The ends of secondary winding 59 of transformer 58 are connected in rectifier 28 to the respective anodes of diodes 100 and 102, the cathodes of which are connected to the positive terminal of battery 22 through an auxiliary load conductor 15. Also comprising rectifier 28 are SCR's 104 and 106 the cathodes of which are respectively connected to the anodes of diodes 102 and 104 thereby defining the legs of the rectifier 28. With the gates thereof suitably enabled as to be described shortly and with the anodes thereof connected through load conductor 14 between batteries 18 and 22, SCR's 104 and 106 are biased into alternate conduction by the AC voltages appearing across the secondary winding 59 of transformer 58.

The gates of SCR's 104 and 106 are enabled and disenabled by PNP output transistor 110 of voltage regulator 30 when the voltage between conductors 15 and 14 is detected to be respectively below and subsequently above the desired terminal voltage of battery 22, here about 12 volts. To provide suitable gate voltages to the SCR's upon conduction through transistor 110, the collector thereof is connected to the cathodes of SCR's 104 and 106 through resistor 112 in series with respectively resistor 114 and 116. To prevent feedback of a positive voltage on one leg of the rectifier to the gate of the SCR in the other leg, diode 118 is connected with the anode thereof to resistor 112 and the cathode thereof both to the gate of SCR 104 and to resistor 114, and diode 120 is connected with the anode thereof to resistor 112 and the cathode thereof to both the gate of the SCR 106 and to resistor 116.

Output transistor 110 of voltage regulator 30 is controlled by the conduction of PNP transistor 122, the emitter of which is commonly connected with the emitter of PNP transistor 110 to auxiliary load conductor 15 and the collector of which is connected to both the base of transistor 110 and through biasing resistor 124 to load conductor 14. Biased from conductor 15 through resistor 126, the base of transistor 122 is connected through Zener diode 128 and wiper arm 130 to potentiometer 132 connected between conductors 14 and 15 in series with voltage dividing resistors 134 and 136. When the voltage between conductors 14 and 15 exceeds the desired terminal voltage across battery 22, transistor 122 is rendered conductive since the potential on conductor 15 will then exceed the potential at wiper 130 by an amount sufficient to break down Zener 128, thereby providing a path for the base current through transistor 122. The increased voltage drop across resistor 124 resulting from conduction through transistor 122 decreases the emitter to base bias on transistor 110, rendering it and in turn SCR's 104 and 106 nonconductive.

Since the operation of rectifier 28 is controlled primarily by the breakdown of Zener 128 to render transistor 112 conductive and transistor 110 nonconductive, capacitor 138 is connected between conductor 15 and the anode of Zener 128 to render the control insensitive to the transients associated with the switching of the SCR's and transistors in the circuit.

Having described one embodiment of the present invention, it is understood that the specific terms and examples are employed in a descriptive sense only and not for the purposes of limitation. Other embodiments of the invention, modifications thereof and alternatives thereto may be used. We therefore aim in the appended claims to cover such modifications and changes as fall within the true spirit of our invention.

What we claim as new and desire to secure by Letters Patent of the United States is:

1. A circuit for charging the first of first and second series connected batteries comprising:
   a. voltage sensitive switch means connected across said second battery and operative to provide a first output voltage when the voltage across said second battery exceeds a first predetermined voltage and a second output voltage when the voltage across said second battery is less than said first predetermined voltage;
   b. controllable oscillator and transformer means operatively connected with said second battery and said voltage sensitive switch, said controllable transformer means rendered operable to provide an AC output voltage by the presence of said first output voltage of said voltage sensitive switch and rendered inoperable by the presence of said second output voltage of said voltage sensitive switch; and
   c. rectifier and regulator means connecting said oscillator and transformer means with said first battery and operative to maintain a second predetermined voltage thereacross when the voltage across said second battery is greater than said first predetermined voltage.

2. In a vehicle charging system including a generator having first and second DC output terminals, one of said output terminals being connected to a point of constant reference potential, a first battery connected between said output terminals of said generator, a second battery having first and second terminals, one of said terminals of said second battery being connected to the other of said generator output terminals, a circuit for charging said second battery comprising:
   a. controllable oscillator means connected between said first and second output terminals of said generator and operative to provide an AC output voltage, said oscillator having operable and nonoperable states:
   b. voltage sensitive switch connected between said output terminals of said generator and operatively connected with said controllable oscillator means to render said oscillator means operable when the voltage across said first and second output terminals of said generator exceeds a first predetermined voltage and to render said oscillator means inoperable when said voltage across said first and second output terminals of said generator is less than said first predetermined voltage;
   c. rectifier means connected with said oscillator means to rectify said AC output voltage and having first and second DC output terminals connected respectively with said first and second terminals of said second battery, said rectifier means comprising a controllable unidirectional current conducting device; and,
   d. voltage regulator means connected between said first and second terminals of said second battery and operatively connected with said controllable unidirectional current conducting device to render said device conductive when the voltage between said first and second terminals of said second battery is less than a second predetermined voltage and to permit said controllable device to become nonconductive when said voltage exceeds said second predetermined voltage, whereby said second predetermined voltage is maintained across said second battery when the output of said generator is greater than said first predetermined voltage.

3. A battery charging system for a dual voltage motor vehicle electrical system wherein first and second batteries are connected in series to supply a high voltage load and wherein at least one of said first and second batteries is utilized to supply a lower voltage electrical load, the combination comprising:
   a. a direct voltage generating means; conductor means connecting the output terminals of said direct voltage generating means with opposite sides of said first battery whereby said first battery can be charged from said direct voltage generating means,
   b. a DC to AC converter means connecting said conductor means with the input of said DC to AC converter including a switching means, voltage sensing means for sensing the voltage across said conductor means;
   c. means connecting said voltage sensing means and said switching means such that said switching means is biased to a conductive condition to electrically connect said conductor means and the input of said DC to AC converter when the voltage across said conductor means exceeds a predetermined value, said switching means being biased to a nonconductive condition by said voltage sensing means when the voltage across said conductor means is below a predetermined value to thereby disconnect said conductor means and said input of said DC to AC converter,
   d. rectifier means having input terminals connected with the output of said DC to AC converter and having direct current output terminals connected across said second battery whereby said second battery can be charged by the voltage appearing across said conductor means through said DC to AC converter when said switching means is biased conductive; and
   e. voltage regulating means including a voltage sensing circuit connected across said second battery for maintaining the voltage applied to said second battery at a predetermined regulated value.

4. A battery charging system for a dual voltage motor vehicle electrical system comprising,
 a. first and second batteries;
 b. a direct voltage generating means having direct current output terminals connected across said first battery for charging said first battery;
 c. a DC to AC converter;
 d. means connecting the input of said DC to AC converter with said first battery including a switching means;
 e. means for biasing said switching means to a conductive condition to electrically connect said first battery and the input of said DC to AC converter when the voltage across said first battery exceeds a predetermined value, said last named means operative to bias said switching means to a nonconductive condition to disconnect said first battery and the input of said DC to AC converter when the voltage across said first battery drops below a predetermined value,
 f. rectifier means having input terminals connected with the output of said DC to AC converter and having direct current output terminals connected across said second battery whereby said second battery can be charged from the system including said first battery when said switching means is biased conductive; and
 g. voltage regulating means including a voltage sensing circuit connected across said second battery for maintaining the voltage applied to said second battery at a predetermined value.

5. A battery charging system for a dual voltage motor vehicle electrical system comprising:
 a. first and second batteries;
 b. direct voltage generating means connected across said first battery for charging said first battery;
 c. DC to DC converter means comprising oscillator transformer and rectifier means, said DC to DC converter connecting said generating means with said second battery;
 d. a voltage sensitive switch connected across said generating means and operatively connected with said DC to DC converter means to render said converter means operable to produce an output therefrom when the voltage across said generating means exceeds a first predetermined voltage and to render said converter means inoperable when said voltage across said generating means is less than said first predetermined voltage; and
 e. voltage regulator means connected across said second battery and operatively connected with said DC to DC converter means to maintain a second predetermined voltage from the output thereof to said second battery when the voltage across said generating means is greater than said first predetermined value.

* * * * *